March 27, 1934.   J. G. BLUNT   1,952,489
RAILWAY VEHICLE WHEEL
Filed Dec. 8, 1932   2 Sheets-Sheet 1
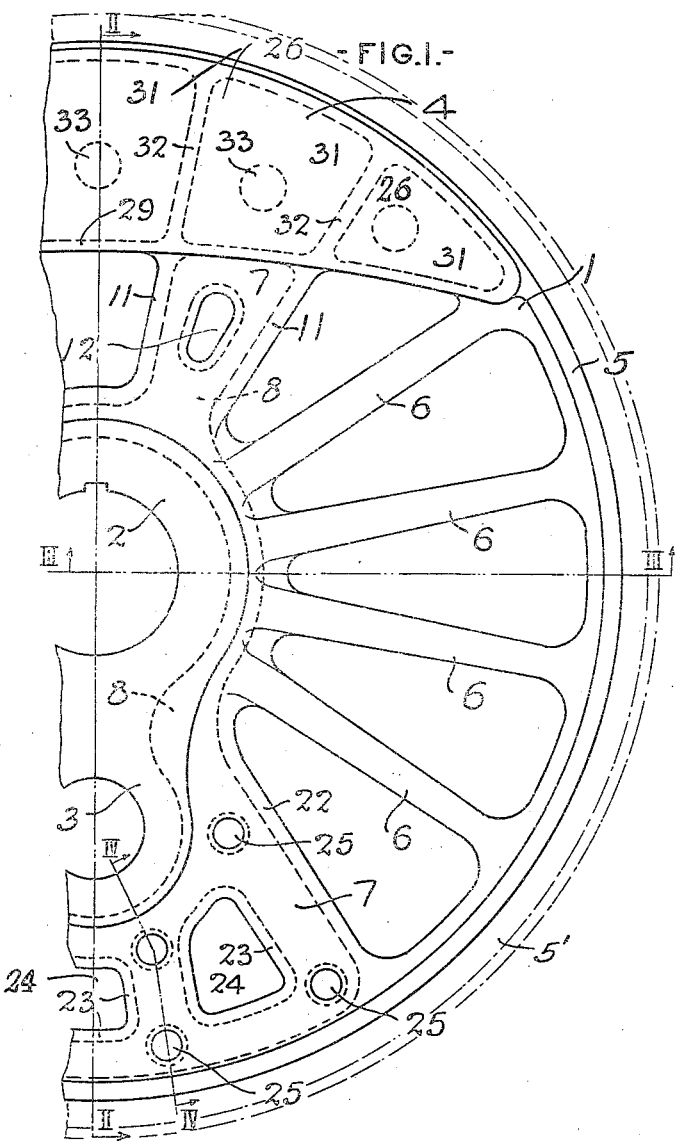
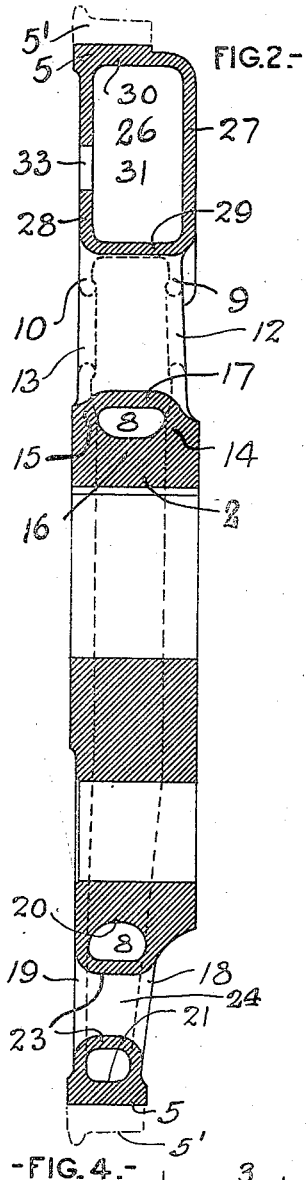
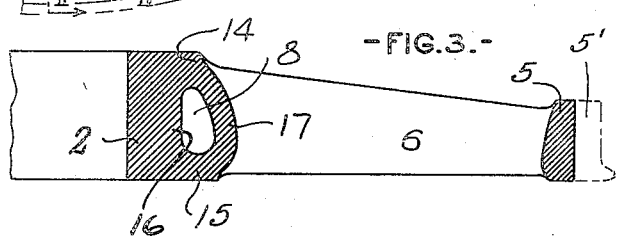
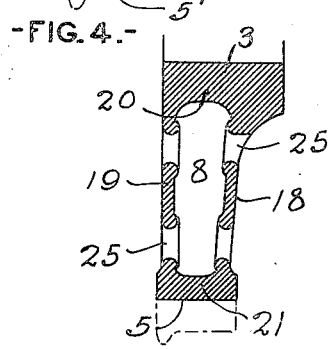
INVENTOR
*James G. Blunt*
BY *S. C. Yeaton*
ATTORNEY

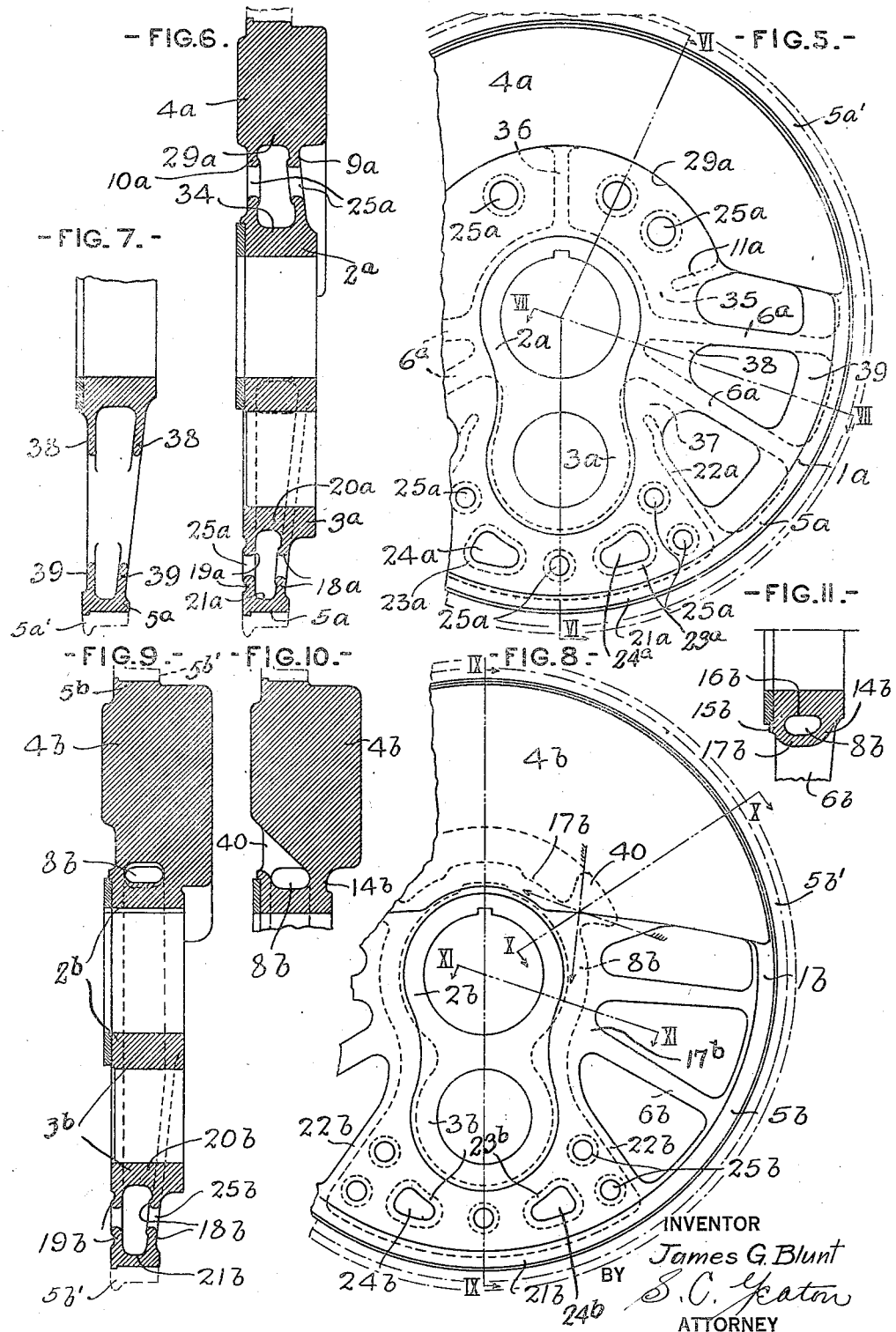

Patented Mar. 27, 1934

1,952,489

UNITED STATES PATENT OFFICE 1,952,489

RAILWAY VEHICLE WHEEL

James G. Blunt, Schenectady, N. Y., assignor to American Locomotive Company, New York, N. Y., a corporation of New York Application December 8, 1932, Serial No. 646,257

18 Claims. (Cl. 295—27)

This invention relates to wheels for railway vehicles and particularly to that type of driving wheel, usually employed for a locomotive, and having a center embodying a crank pin hub and a counterbalance block.

An object of this invention is to provide a driving wheel construction having an improved center characterized by an efficient distribution of metal and a maximum degree of strength.

A further object is to provide an improved wheel center of the character aforedescribed which may be manufactured with a relatively great degree of certainty as to freedom from defects.

A further object is to provide an improved wheel center embodying a substantially box section structure in certain parts thereof and solid spokes at other parts thereof.

Other and further objects and advantages achieved by the present invention will be apparent from the following detailed description and claims.

In the usual practice of manufacturing a driving wheel center, a casting is made with a large mass of solid metal forming an axle hub and a crank pin hub for the wheel center, another mass forming a counterbalance, a rim of solid section, and spokes connecting the rim and counterbalance to the axle and crank pin hubs. The counterbalance may be of such size and shape relative to the whole wheel center that the axle hub and counterbalance are directly joined to each other, rendering spokes unnecessary for this purpose. The spokes of these constructions ordinarily are solid and taper from the center mass toward the rim, the spokes being of a materially less size in cross sectional dimension than the thickness of the hubs where the spokes leave the hubs. In the process of casting, this difference in size frequently causes excessive shrinkage strains. The counterbalance being on the opposite side of the axle hub to the crank pin hub, and the casting metal being poured at a point substantially intermediate of the center of the axle hub and the center of the crank pin hub, there is exerted on the short spokes, which connect the crank pin hub to the rim and the counterbalance to the axle hub by reason of the spokes cooling before the larger masses, a very great pulling force, as the larger masses of the casting which they connect, cool and shrink.

The above reactions often result in shrinkage cracks in the short spokes, causing substantial foundry losses. These cracks often are not visible until after the machining of the wheel center has been completed, additional delays and increased losses being thus occasioned.

It is well known that most failures of wheel centers occur in the short spokes, that is to say, in the spokes extending between the axle hub and the counterbalance, and between the crank pin hub and the rim. The desirability and advantage of a wheel characterized by an efficient distribution of metal throughout, in which construction there will be a minimization of losses caused by shrinkage cracks as aforesaid, and the desirability and advantage of producing a wheel characterized by the greatest possible strength and by a relatively great degree of certainty as to freedom from defects, particularly at the aforementioned locations of most frequent breakage, will be readily appreciated. The present invention provides a wheel embodying these characteristics to a higher degree than has been attained heretofore.

The present invention embodies an improved box-shaped structure, applied to those parts of the wheel center only, which most frequently fail, the other parts of the wheel, for the sake of economy, being of usual construction.

The invention is illustrated in the accompanying drawings in which Figure 1 is a fragmentary front view in elevation of a driving wheel having a center embodying the present invention and provided with a tire, indicated by broken lines; Fig. 2 is a section on the line II—II of Fig. 1; Fig. 3 is a section on the line III—III of Fig. 1; Fig. 4 is a section on the line IV—IV of Fig. 1; Fig. 5 is a fragmentary front view in elevation of a driving wheel having a center embodying a modified form of the present invention and provided with a tire, indicated by broken lines; Fig. 6 is a section on the line VI—VI of Fig. 5; Fig. 7 is a section on the line VII—VII of Fig. 5; Fig. 8 is a fragmentary front view in elevation of a driving wheel having a center embodying another modified form of the present invention and provided with a tire indicated by broken lines; Fig. 9 is a section on the line IX—IX of Fig. 8; Fig. 10 is a section on the line X—X of Fig. 8; and Fig. 11 is a section on the line XI—XI of Fig. 8. While in Figs. 1, 5 and 8 only the right hand half of the wheel has been shown in full, it will be noted that both halves are similar.

Referring in detail to the drawings and particularly to Figs. 1 to 4 inclusive, there is here illustrated a driving wheel center indicated generally by the numeral 1. This driving wheel center comprises an integral casting embodying an axle hub 2, a crank pin hub 3 adjacent the axle hub at one side thereof, a counterbalance portion 4 spaced from the axle hub on the side thereof opposite the crank pin hub, and a rim 5 around the periphery of the casting. The rim and axle hub are connected at locations at the sides of the couterbalance portion by integrally formed spokes 6, which are of the usual solid construction, four being provided, in the present instance, on each side of the counterbalance portion. The counterbalance portion 4 and axle hub 2, and the crank pin hub 3 and rim 5 are respectively connected by a box section construction indicated generally by the numeral 7. The construction 7 extends about the axle hub 2 and crank pin hub 3 providing a continuous core 8.

Between the counterbalance portion 4 and the axle hub 2, the construction 7 comprises front and rear walls 9 and 10 respectively, which are especially adapted to resist revolving or turning stresses, and pairs of side walls 11 transverse of the wheel center, which connect the walls 9 and 10 and which are especially adapted to resist lateral or wheel flange stresses. There is thus provided, between the counterbalance portion and the axle hub, in the instance described, two hollow short spokes or substantially spoke-shaped structures, which take the place of the solid short spokes usually employed at this location. The walls 9, 10 and 11 are of uniform thickness and the walls 9 and 10 are provided with openings 12 and 13 respectively to permit the removal of core material.

The construction 7, at the inner ends of the spokes 6, at each side of the axle hub, (see Fig. 3) comprises a front wall 14 and a rear wall 15 which are continuations of the walls 9 and 10 respectively, an inner side wall 16 and an outer side wall 17. These walls 14, 15, 16 and 17 thus enclose the respective parts of the continuous core 8, at the inner ends of the spokes 6. The spokes 6 blend into the walls 17.

The part of the box section construction 7 between the inner walls of the pairs of side walls 11 around the core 8, at this portion, (see Fig. 2) is similar to the aforedescribed part of the construction 7 around the core 8, shown in Fig. 3.

Between the crank pin hub 3 and the rim 5, the box section construction 7 comprises a front wall 18 which is a continuation of the wall 14, a rear wall 19 which is a continuation of the wall 15, an inner side wall 20 which is a part of the crank pin hub, an outer wall 21 which is a part of the rim, and transverse end walls 22 joining the walls 18 and 19 and extending from the wall 21 to the walls 17. The walls 18 and 19 are also connected by transverse walls 23 surrounding pairs of oppositely disposed openings 24 formed in the walls 18 and 19 respectively. Openings 25 are formed in the walls 18 and 19 for the purpose of removing the core material used in the process of manufacturing the wheel center. There is thus provided between the crank pin hub and the rim four hollow spokes or box-shaped structures which take the place of the solid short spokes usually employed at this location.

The counterbalance portion 4, as aforesaid, is provided for the wheel center, spaced from the side of the axle hub opposite to the crank pin hub side. The counterbalance portion comprises a cored space 26 surrounded by a front wall 27 and a rear wall 28, which are continuations of the walls 9 and 10 respectively, an inner transverse side wall 29, and a wall 30, a part of which is a part of the rim 5. The space 26 is divided into pockets 31 by transverse partitions 32 which are continuations of the walls 11. Openings 33 are formed in the wall 28, one for each of the pockets 31 to permit the removal of the core material from the pockets and the introduction of counterbalance material.

A tire 5' of usual construction is provided for the wheel center and secured to the rim 5 in the usual manner, the tire being indicated in the drawings by broken lines.

Referring to Figs. 5 to 7 inclusive, there is here illustrated a driving wheel having a center indicated generally by the numeral 1a, embodying a modified form of the present invention. This wheel center 1a is in many respects similarly constructed to the wheel center 1, aforedescribed, and like parts are indicated by like reference numerals with the letter "a" added to the numerals designating the corresponding parts of the wheel center 1a. The counterbalance 4a, the axle hub 2a and crank pin hub 3a are not of box section construction, but are of solid construction. The wheel center 1a is of box section formation however, between the axle hub 2a and the counterbalance 4a, this formation not extending entirely around the axle and crank pin hubs but terminating at the adjacent spokes 6a. This box section construction comprises a front wall 9a, a rear wall 10a, transverse side walls 11a, an outer transverse wall 29a which is a part of the counterbalance, and an inner wall 34 which is a part of the outer wall of the axle hub 2a. The walls 11a are not continuous, but extend inwardly from the counterbalance, and terminate short of the hub 2a, so as to leave openings 35 to permit the removal of the core material. For the same purpose, the openings 25a are formed in the walls 9a and 10a. This box section construction is sub-divided by a transverse central wall 36, which serves to assist the molten metal, during the casting operation, to flow more easily from the mass of the hub 2a to the solid counterbalance 4a and also provides additional strengthening means for the wheel center.

On the crank pin hub side of the wheel center 1a, a box section construction is provided, between the crank pin hub 3a and the rim 5a. This box section construction comprises a front wall 18a, a rear wall 19a, transverse end walls 22a, an inner side wall 20a which is a part of the crank pin hub 3a, and an outer side wall 21a, which is a part of the inner wall of the rim 5a. The side walls 22a are not continuous but extend inwardly from the rim 5a and terminate short of the crank pin hub leaving openings 37 to permit the removal of core material. Openings 25a are also formed in the walls 18a and 19a to permit the removal of core material. Pairs of oppositely disposed openings 24a are formed in the walls 18a and 19a respectively and the walls are connected around each pair of openings by a transverse wall 23a. Spokes 6a of solid construction are integrally formed with the casting of the wheel center 1a and extend from the axle hub 2a to the rim 5a at the sides of the counterbalance 4a. Extending outwardly from the axle hub at the inner ends of the spokes, strengthening webs or walls 38 are provided. The walls 38 are formed integrally with and comprise continuations of the front and rear walls 9a and 10a of the box section construction adjacent the counterbalance and the walls 18a and 19a of the box section construction adjacent the crank pin hub. Extending inwardly from the rim 5a at the outer ends of the spokes, strengthening webs or walls 39, are formed integrally with, and comprise continuations of, the front and rear walls 18a and 19a. The wheel center 1a is provided with a tire 5a', similarly as described with reference to the tire 5' of the wheel center 1.

Referring now to Figs. 8 to 11 inclusive, there is here illustrated a driving wheel having a center indicated generally by the numeral 1b embodying another modified form of the present invention. The wheel center 1b is in many respects similar to the construction of the wheel center 1 and like parts of the wheel center 1b are indicated by the same reference numerals as those designating the corresponding parts of the wheel center 1 with the letter "b" added to the numerals designating the corresponding parts of the wheel center 1b. Here the counterbalance 4b is of solid formation and is of such size as to extend at its central portion, the entire distance from the rim 5b to the axle hub 2b so that there are neither short spokes nor a box section construction connecting it with the axle hub. A continuous core 8b is provided around the axle and crank pin hubs. To facilitate the removal of material from the core, pockets 40 are formed in the counterbalance communicating with the core 8b. The pockets are of such shape as to permit of taking out the core by inserting a tool through the pockets into the core in two directions at right angles to each other, as indicated by the arrows in Fig. 8. The core 8b adjacent the counterbalance is formed similarly to the corresponding structure of the wheel center described with reference to Fig. 3 excepting that for the wheel center 1b, the wall 17b at this location is a part of the inner transverse wall of the counterbalance. Likewise the wheel center 1b at each side thereof is provided with a box section construction at the inner ends of the spokes 6b as shown in Fig. 11 which is similar to the corresponding portions of the wheel center 1 described with reference to Fig. 3.

Between the crank pin hub 3b and the rim 5b, the wheel center 1b is provided with a box section construction similar to the corresponding portion of the wheel center 1a excepting that for the wheel center 1b the side walls 22b are continuous and merge at their inner ends with the walls 17b. The wheel center 1b is provided with a tire 5b', similarly as described with reference to the tire 5' of the wheel center 1. The walls 18b and 19b, are similar to the walls 18a and 19a except that the walls 18b and 19b are continuations of the walls 14b and 15b respectively.

From the foregoing description it will be apparent that the several structures embodying the present invention provide locomotive driving wheel centers wherein, there is an efficient distribution of metal throughout, thus avoiding losses resulting from shrinkage cracks; wherein an improved box section construction is provided at those locations in the wheel center where breakage is most likely to occur; and which structures are of relatively great strength particularly in the locations of most frequent breakage.

While there is hereinbefore described certain embodiments of the present invention, it will be apparent to those skilled in the art that many and various changes and modifications may be made without departing from the spirit of the invention and it will be understood that all such changes and modifications as fall within the spirit of the present invention as defined in the appended claims are contemplated as a part of the present invention.

What is claimed and desired to be secured by Letters Patent is:

1. A locomotive driving wheel center comprising an axle hub; a crank pin hub; a rim; a substantially box section structure surrounding said hubs and extending at one part thereof to said rim, said part including front and rear substantially vertical spaced walls, transverse side walls connecting said front and rear walls, registering openings through said front and rear walls, and transverse walls connecting said front and rear walls around said openings; and spokes connecting said structure and said rim at another part of said wheel center.

2. A locomotive driving wheel center comprising an axle hub; a crank pin hub; a rim; a counterbalance portion adjacent a part of said rim; a substantially box section structure surrounding said hubs and extending at one part thereof to said counterbalance portion, said part including front and rear substantially vertical spaced walls, transverse side walls connecting said front and rear walls, registering openings through said front and rear walls, and transverse walls connecting said front and rear walls around said openings; and spokes connecting said structure and said rim at another portion of said wheel center.

3. A locomotive driving wheel center comprising an axle hub; a crank pin hub; a rim; a substantially box section structure surrounding said hubs and extending at one part thereof from said crank pin hub to said rim, said part including front and rear substantially vertical spaced walls, transverse side walls connecting said front and rear walls, registering openings through said front and rear walls, and transverse walls connecting said front and rear walls around said openings; and spokes connecting said rim and said structure at another part of said wheel center.

4. A locomotive driving wheel center comprising an axle hub; a crank pin hub; a rim; a counterbalance portion adjacent a part of said rim; a substantially box section structure surrounding said hubs and extending at one part thereof from said axle hub to said counterbalance portion and in another part thereof from said crank pin hub to said rim, each of said parts including front and rear substantially vertical spaced walls, transverse side walls connecting said front and rear walls, registering openings through said front and rear walls, and transverse walls connecting said front and rear walls around said openings; and spokes connecting said structure and said rim at other parts of said wheel center.

5. A locomotive driving wheel center comprising an axle hub; a crank pin hub; a rim; a counterbalance portion adjacent a part of said rim; a substantially box section structure connecting said axle hub and said counterbalance portion, including front and rear substantially vertical spaced walls, transverse side walls connecting said front and rear walls, registering openings through said front and rear walls, and transverse walls connecting said front and rear walls around said openings; and spokes connecting another part of said rim and said axle hub.

6. A locomotive driving wheel center comprising an axle hub; a crank pin hub; a rim; a counterbalance portion adjacent a part of said rim; a substantially box section structure connecting said axle hub and said counterbalance portion, including front and rear substantially vertical spaced walls, transverse side walls connecting said front and rear walls, registering openings through said front and rear walls, and transverse walls connecting said front and rear walls around said openings; a substantially box section structure connecting said crank pin hub and another part of said rim, including front and rear substantially vertical spaced walls, transverse side walls connecting said front and rear walls, registering openings through said front and rear walls, and transverse walls connecting said front and rear walls around said openings; and spokes connecting said axle hub and other parts of said rim.

7. A locomotive driving wheel center comprising an axle hub; a crank pin hub; a rim; a counterbalance portion adjacent a part of said rim; a substantially box section structure connecting said axle hub and said counterbalance portion, including front and rear substantially vertical spaced walls and transverse side walls connecting said front and rear walls; a substantially box section structure connecting said crank pin hub and another part of said rim, including front and rear substantially vertical spaced walls, transverse side walls connecting said front and rear walls, registering openings through said front and rear walls, and transverse walls connecting said front and rear walls around said openings; spokes connecting said axle hub and other parts of said rim; and webs adjacent the inner ends of said spokes connected to said inner ends and to said axle hub.

8. A locomotive driving wheel center comprising an axle hub; a crank pin hub; a rim; a counterbalance portion adjacent a part of said rim; a substantially box section structure connecting said axle hub and said counterbalance portion, including front and rear substantially vertical spaced walls and transverse side walls connecting said front and rear walls; a substantially box section structure connecting said crank pin hub and another part of said rim, including front and rear substantially vertical spaced walls, transverse side walls connecting said front and rear walls, registering openings through said front and rear walls, and transverse walls connecting said front and rear walls around said openings; spokes connecting said axle hub and other parts of said rim; and webs adjacent the outer ends of said spokes connected to said outer ends and to said rim.

9. A locomotive driving wheel center comprising an axle hub; a crank pin hub; a rim; a counterbalance at one side of said wheel center, the central portion of said counterbalance extending from said rim to said axle hub and said counterbalance being shaped to provide a core adjacent said axle hub; a substantially box section structure adjacent said hubs providing a core adjacent said hubs, merging with said counter-balance core; and spokes connecting said structure with said rim.

10. A locomotive driving wheel center comprising an axle hub; a crank pin hub; a rim; a counterbalance at one side of said wheel center, the central portion of said counterbalance extending from said rim to said axle hub; a substantially box section structure adjacent said hubs, and extending from said crank pin hub to said rim; and spokes connecting portions of said rim to said structure.

11. A locomotive driving wheel center comprising an axle hub; a crank pin hub; a rim; a counterbalance of solid formation extending from a part of said rim to said axle hub, said counterbalance being shaped to provide a core adjacent a part of said axle hub and being provided with openings in one of its sides, permitting access to the interior of said core; and spokes connecting other portions of said rim with said axle hub.

12. A locomotive driving wheel center comprising an axle hub; a crank pin hub; a rim; a counterbalance portion; a substantially box section structure in a part of said wheel center connecting said axle hub and said counterbalance portion, comprising walls arranged to support carying loads, certain of said walls being arranged to especially resist turning stresses and certain of said walls being arranged to especially resist wheel flange stresses; and spokes of solid formation extending between said axle hub and said rim in other parts of said wheel center.

13. A locomotive driving wheel center comprising an axle hub; a crank pin hub; a rim; a substantially box section structure in one part of said wheel center extending between said crank pin hub and said rim, comprising walls arranged to support carrying loads, certain of said walls being arranged to especially resist turning stresses and certain of said walls being arranged to especially resist wheel flange stresses; and spokes of solid formation in other parts of said wheel center connecting said axle hub and said rim.

14. A locomotive driving wheel center comprising an axle hub; a crank pin hub; a rim; a counterbalance portion adjacent one part of said rim; a substantially box section structure surrounding said hubs, connecting said axle hub and said counterbalance portion, and connecting said crank pin hub and said rim, said structure comprising walls arranged to support carrying loads, certain of said walls being arranged to especially resist turning stresses and certain of said walls being arranged to especially resist wheel flange stresses; and spokes of solid formation connecting said structure and said rim in parts of said wheel center at the sides of said counterbalance portion.

15. A locomotive driving wheel center comprising an axle hub; a crank pin hub; a rim, solid spokes connecting parts of said rim to said axle hub; and substantially box section spokes for connecting said crank pin hub and other parts of said rim.

16. A locomotive driving wheel center comprising an axle hub; a crank pin hub; a rim; a substantially box section structure surrounding said hubs; solid spokes connecting said structure and parts of said rim; and substantially box section spokes connecting said structure and a part of said rim adjacent said crank pin hub.

17. A locomotive driving wheel center comprising an axle hub; a crank pin hub; a rim; a counterbalance portion adjacent a part of said rim; a substantially box section structure surrounding said hubs; solid spokes connecting said structure and parts of said rim; and substantially box section spokes connecting said structure and counterbalance portion.

18. A wheel center comprising a hub; a rim; front and rear substantially vertical, spaced walls disposed between said hub and said rim over a portion of said center, said walls having registering openings; transverse walls connecting said front and rear walls at oppositely disposed ends thereof and along oppositely disposed edges of said openings, said front, rear and transverse walls combining to form a hollow structure box-shaped in cross section through opposite transverse walls; and solid spokes between said hub and said rim at another portion of said center.

JAMES G. BLUNT.